US009909943B2

(12) United States Patent
Ono et al.

(10) Patent No.: US 9,909,943 B2
(45) Date of Patent: Mar. 6, 2018

(54) DEVICE FOR INSPECTING BRAKING MECHANISM FOR ELECTRIC MOTOR, AND INSPECTION METHOD

(71) Applicant: FANUC CORPORATION, Yamanashi (JP)

(72) Inventors: Katsuya Ono, Yamanashi (JP); Takeshi Tamaki, Yamanashi (JP); Kaname Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/334,570

(22) Filed: Oct. 26, 2016

(65) Prior Publication Data
US 2017/0115174 A1    Apr. 27, 2017

(30) Foreign Application Priority Data
Oct. 26, 2015  (JP) .................................. 2015-210071

(51) Int. Cl.
*G01M 19/00*  (2006.01)
*G01L 5/28*  (2006.01)
(Continued)

(52) U.S. Cl.
CPC .................. *G01L 5/28* (2013.01); *H02K 7/10* (2013.01); *H02K 7/1025* (2013.01); *H02K 11/20* (2016.01); *H02P 3/04* (2013.01); *H02P 3/06* (2013.01)

(58) Field of Classification Search
USPC .......................................... 73/121, 128, 129
See application file for complete search history.

(56) References Cited

U.S. PATENT DOCUMENTS 4,173,732 A * 11/1979 Anderson ................. H02P 3/12
                                                       318/375
6,081,086 A *  6/2000 Roth-Stielow ............ B60L 7/10
                                                       318/254.2
(Continued)

FOREIGN PATENT DOCUMENTS

JP         9100855 A    4/1997
JP       200459317 A    2/2004
(Continued)

OTHER PUBLICATIONS

English Abstract and Machine Translation for Japanese Publication No. 2005-042833, published Feb. 17, 2005,11 pgs.
(Continued)

*Primary Examiner* — Eric S McCall
(74) *Attorney, Agent, or Firm* — Fredrikson & Byron, P.A.

(57) ABSTRACT

A device can prevent a failure in the actuation of a braking mechanism, which is caused by adhesion of adhesive substances. The device includes a heating part for heating the braking mechanism, a heat controller for controlling a heating operation of the heating part, a brake controller for actuating the braking mechanism when the heat controller stops the heating operation, and the temperature of the braking mechanism decreases, an actuation delay measuring part for measuring an actuation delay of the braking mechanism when the brake controller actuates the braking mechanism, and a comparison part for comparing the actuation delay measured by the actuation delay measuring part with a reference value of the actuation delay of the braking mechanism.

12 Claims, 12 Drawing Sheets

(51) Int. Cl.
*H02K 7/10* (2006.01)
*H02P 3/06* (2006.01)
*H02P 3/04* (2006.01)
*H02K 7/102* (2006.01)
*H02K 11/20* (2016.01)

(56) References Cited

U.S. PATENT DOCUMENTS

| | | | |
|---|---|---|---|
| 6,851,765 B1 * | 2/2005 | Disser | B60T 13/741 303/122.03 |
| 2005/0001635 A1 * | 1/2005 | Kojima | B60L 7/06 324/713 |
| 2005/0023894 A1 * | 2/2005 | Ushiyama | G05B 19/4062 303/122.05 |
| 2009/0114488 A1 * | 5/2009 | Bailey | B60T 13/74 188/1.11 E |
| 2017/0033714 A1 * | 2/2017 | Ono | H02P 3/08 |

FOREIGN PATENT DOCUMENTS

| | | |
|---|---|---|
| JP | 200542833 A | 2/2005 |
| JP | 2006345602 A | 12/2006 |
| JP | 2012-235646 A | 11/2012 |
| JP | 2014152852 A | 8/2014 |

OTHER PUBLICATIONS

English Abstract and Machine Translation for Japanese Publication No. 2014-152852, published Aug. 25, 2014, 15 pgs.
English Abstract and Machine Translation for Japanese Publication No. 2012-235646 A, published Nov. 29, 2012, 12 pgs.
English Abstract and Machine Translation for Japanese Publication No. 2006-345602 A, published Dec. 21, 2006, 23 pgs.
English Abstract and Machine Translation for Japanese Publication No. 2004-059317 A, published Feb. 26, 2004, 18 pgs.
English Abstract and Machine Translation for Japanese Publication No. 09-100855 A, published Apr. 15, 1997, 9 pgs.

* cited by examiner

DEVICE FOR INSPECTING BRAKING MECHANISM FOR ELECTRIC MOTOR, AND INSPECTION METHOD

BACKGROUND OF THE INVENTION

1. Field of the Invention

The invention relates to a device for inspecting a braking mechanism for an electric motor, and an inspection method.

2. Description of the Related Art

Various braking mechanisms for holding a rotary shaft of an electric motor have been known (see, for example, Japanese Unexamined Patent Publication (Kokai) Nos. 2005-042833 and 2014-152852).

When it is determined whether or not a brake for an electric motor has broken down is verified, and operations of the electric motor are confirmed generally before the electric motor operates. Specifically, there is, for example, a method in which a current probe or a voltage probe is set to the power supply for the brake, to confirm, by an oscilloscope, a waveform when the brake operates.

When an electric motor operates, adhesive substances including cutting fluid may adhere to movable members which constitute a braking mechanism in some cases. Such adhesion of adhesive substances to the movable members of the braking mechanism may interfere with the actuation of the movable members, and thus, may cause a failure in the actuation of the braking mechanism.

Conventionally, a technology for previously detecting such a failure in the actuation of the braking mechanism, which is caused by adhesion of adhesive substances, has been required.

SUMMARY OF THE INVENTION

In an aspect of the invention, a device for inspecting a braking mechanism which holds a rotary shaft of an electric motor includes a heating part which heats the braking mechanism, a heat controller which controls a heating operation of the heating part, and a brake controller which actuates the braking mechanism when the heat controller stops the heating operation and a temperature of the braking mechanism decreases.

The device includes an actuation delay measuring part which measures an actuation delay of the braking mechanism when the brake controller actuates the braking mechanism, and a comparison part which compares the actuation delay measured by the actuation delay measuring part with a reference value of the actuation delay of the braking mechanism.

The brake controller may further actuate the braking mechanism before the heating operation. The actuation delay measuring part may measure, as the reference value, an actuation delay of the braking mechanism. The reference value may be previously stored in a storage.

The heating part may include a coil wound around a stator of the electric motor. The actuation delay measuring part may measure, as the actuation delay, an elapsed time from a time point when the brake controller sends a command for actuating the braking mechanism to a time point when the braking mechanism holds the rotary shaft.

A load may be previously applied to the rotary shaft in a gravity direction. The actuation delay measuring part may measure, as the actuation delay, a displacement of the rotary shaft in the gravity direction. The device may further include an alarm generating part which generates an alarm signal, when the comparison part compares the actuation delay measured by the actuation delay measuring part with the reference value and detects that the actuation delay exceeds the reference value.

The device may further include an image generating part which generates image data representing the actuation delay measured by the measuring part, and a display which displays the image data generated by the image generating part. The device may further include an excitation controller which applies voltage to a coil wound around a stator of the electric motor so as to excite the electric motor when the actuation delay measured by the measuring part exceeds a predetermined acceptable value.

The device may further include a temperature detecting part which detects the temperature of the braking mechanism. The heat controller may control the heating part so as to carry out the heating operation until the temperature detected by the temperature detecting part increases to a predetermined first temperature.

The brake controller may actuate the braking mechanism, when the heat controller stops the heating operation and the temperature detected by the temperature detecting part decreases from the first temperature to a predetermined second temperature.

The heat controller may heat the braking mechanism for a predetermined period. The brake controller may actuate the braking mechanism when a predetermined time elapses from when the heat controller stops the heating operation.

In another aspect of the invention, a method of inspecting a braking mechanism which holds a rotary shaft of an electric motor, includes heating the braking mechanism, and stopping to heat the braking mechanism so as to decrease a temperature of the braking mechanism.

The method includes actuating the braking mechanism when the temperature of the braking mechanism decreases, measuring an actuation delay of the braking mechanism when actuating the braking mechanism, and comparing the measured actuation delay with a reference value of the actuation delay of the braking mechanism.

BRIEF DESCRIPTION OF THE DRAWINGS

The above-mentioned and other objects, features, and advantages of the invention will be clarified from the detailed description of embodiments with reference to the accompanying drawings, in which.

DETAILED DESCRIPTION

Figure 1:
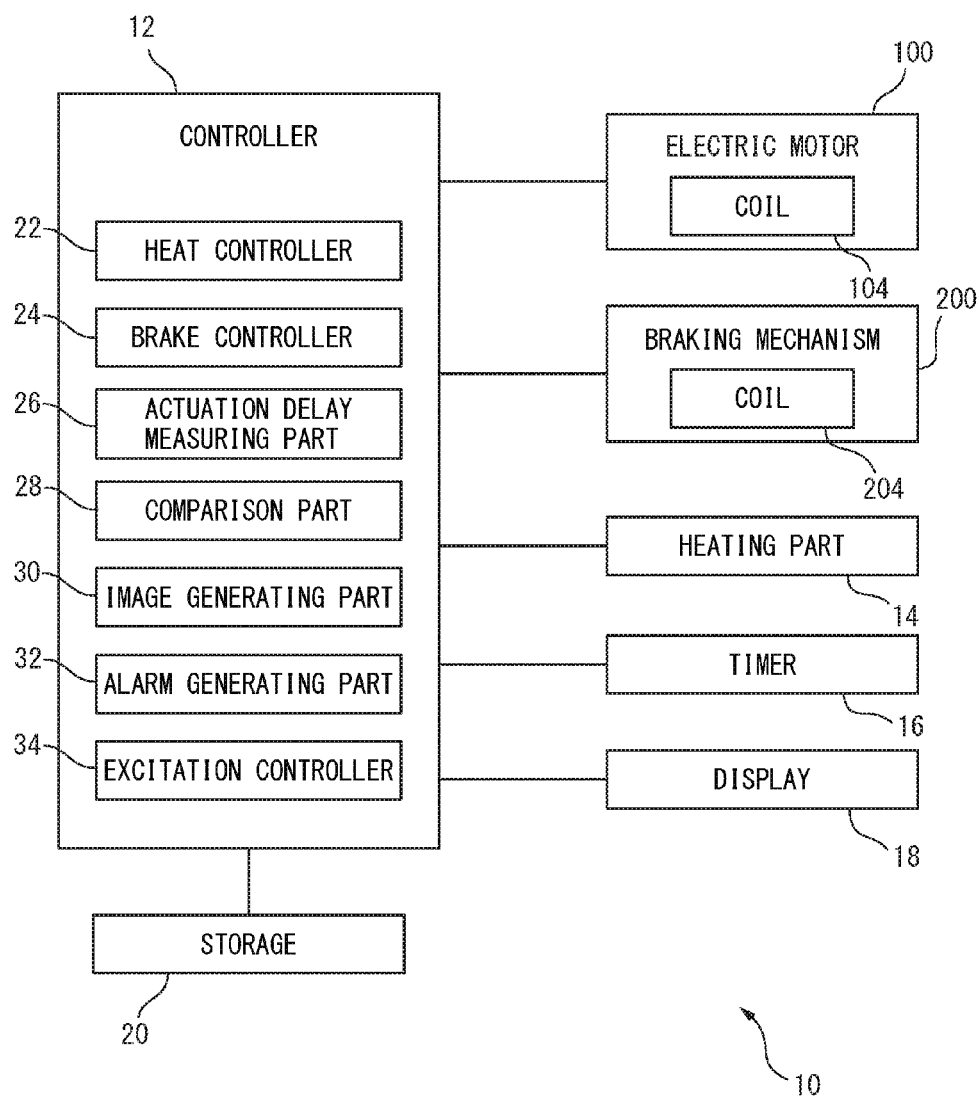
FIG. 1 is a block diagram of a device according to an embodiment of the invention.
Figure 2:
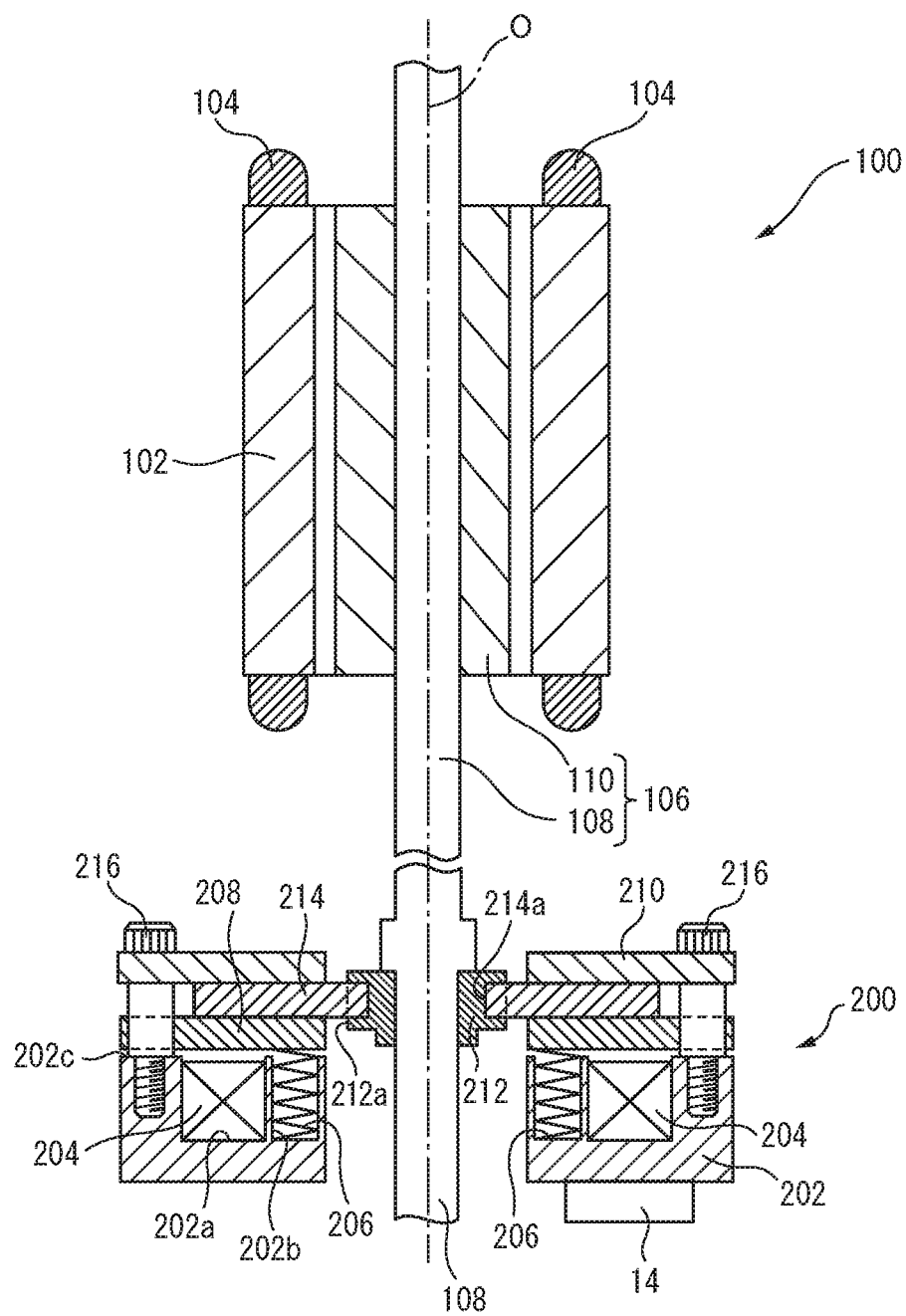
FIG. 2 is a cross-sectional view of an electric motor and the braking mechanism shown in FIG. 1, in which the braking mechanism is actuated.
Figure 3:
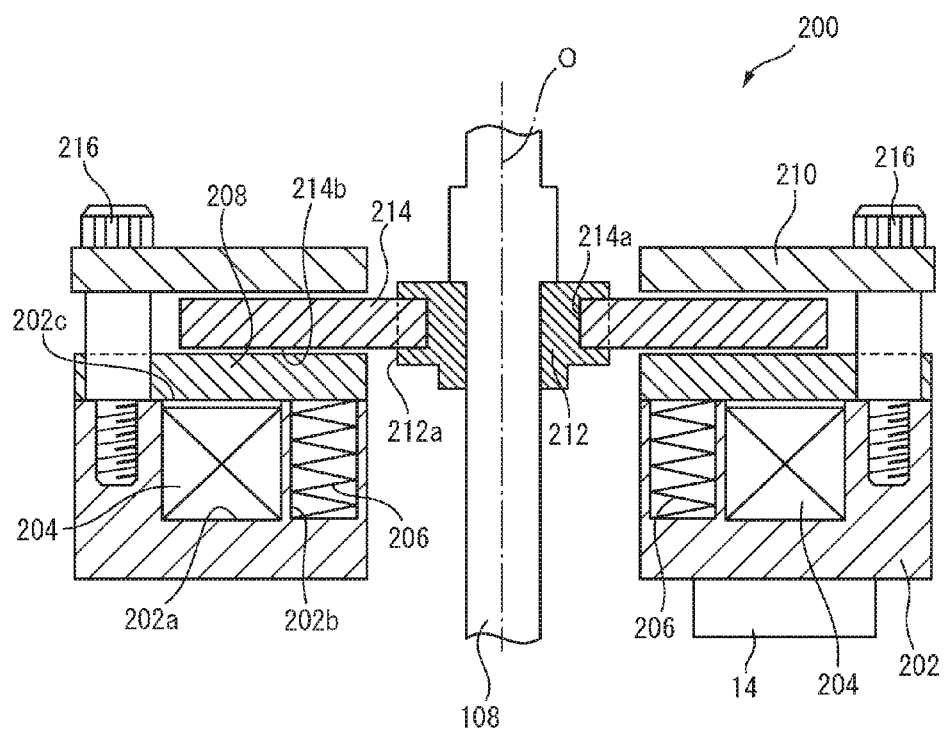
FIG. 3 is a cross-sectional view showing a state where the braking mechanism in FIG. 2 is released.

Embodiments of the invention will be described below with reference to the accompanying drawings. With reference to FIGS. 1 to 3, a device 10 according to an embodiment of the invention will be described.

Figure 9:
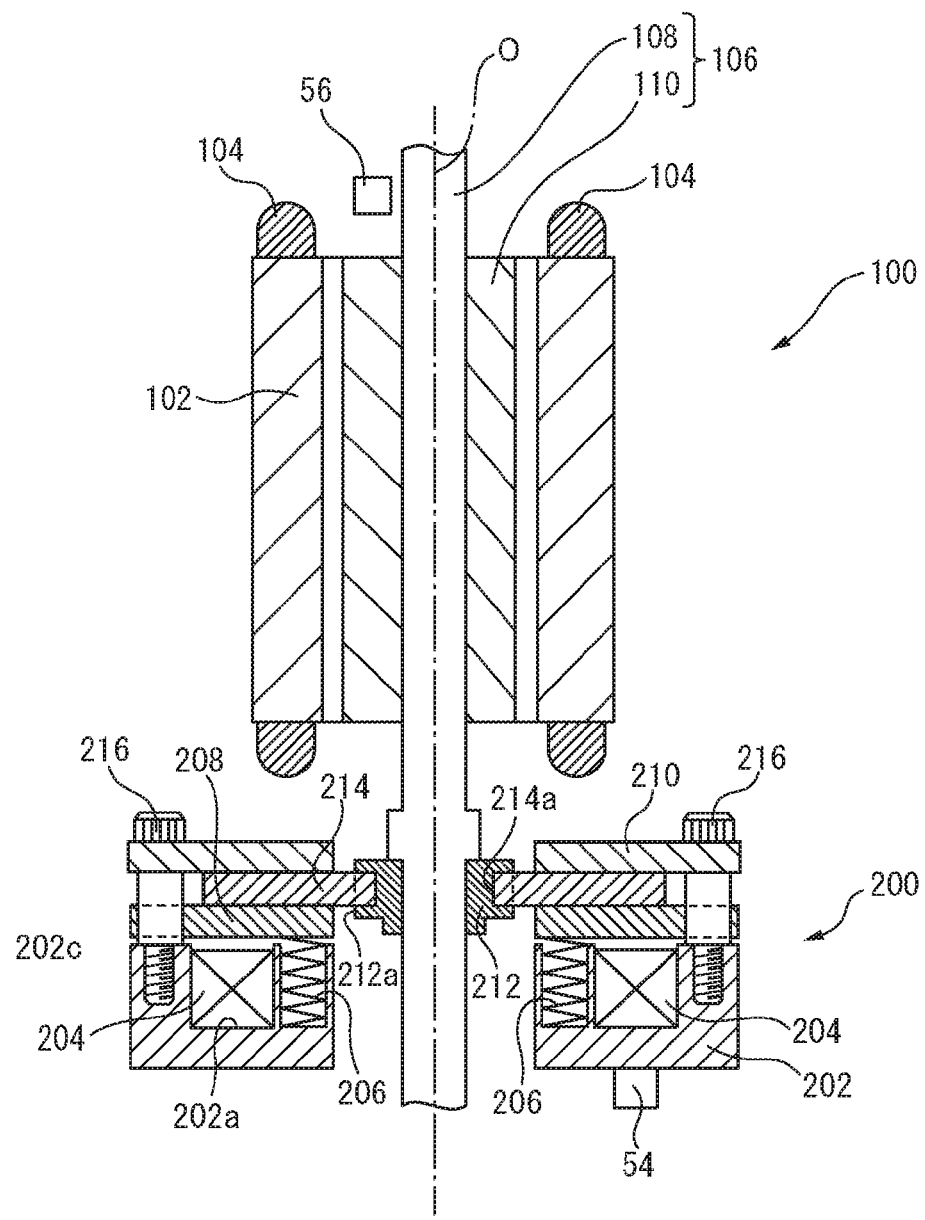
FIG. 9 is a cross-sectional view of an electric motor and the braking mechanism shown in FIG. 8, in which the braking mechanism is actuated.

Note that, in the following description, the axial direction indicates a direction along a rotation axis O of a rotary shaft 108 of an electric motor 100, and, for convenience, upward in FIGS. 2, 3, and 9 is referred as axially upward (i.e., upper direction in the axial direction). Further, in the following description, the radial direction indicates a direction of radius of a circle centered about the axis O, and the circumferential direction indicates a circumferential direction of the circle centered about the axis O.

The device 10 is for inspecting a braking mechanism 200 which holds the rotary shaft 108 of the electric motor 100. Below, the electric motor 100 and the braking mechanism 200 will be described.

As shown in FIG. 2, the electric motor 100 includes a stator 102, a coil 104 wound around the stator 102, and a rotor 106 rotatably supported at radially inside of the stator 102.

The rotor 106 includes a rotary shaft 108 and a rotor core 110 fixed radially outside of the rotary shaft 108. A magnet (not shown) is embedded in the rotor core 110.

The coil 104 is electrically connected to a power supply (not shown) installed outside of the electric motor 100. Voltage is applied from the power supply to the coil 104 so as to generate a rotating magnetic field. The rotor 106 receives a force from the rotating magnetic field, thereby rotates around the axis O.

The braking mechanism 200 can hold the rotary shaft 108 of the electric motor 100. The braking mechanism 200 includes a brake core 202, a coil 204, a biasing member 206, an armature 208, an end plate 210, a hub 212, and a friction plate 214.

The brake core 202 is an annular member made of e.g. a magnetic material such as iron, and is arranged to be centered about the axis O. The brake core 202 includes a first recess 202a and a second recess 202b formed at radially inside of the first recess 202a. Each of the first and second recess 202a and 202b is formed so as to be recessed axially downward from an axially upper end face 202c of the brake core 202.

The coil 204 is accommodated in the first recess 202a of the brake core 202, and is wound in the circumferential direction. The coil 204 is electrically connected to a power supply (not shown) installed outside, which applies voltage to the coil 204 so as to excite the brake core 202.

The biasing member 206 is accommodated in the second recess 202b of the brake core 202. The biasing member 206 includes e.g. a coil spring, and biases the armature 208 to axially upward.

The armature 208 is an annular member made of a magnetic material, and is arranged to be centered about the axis O. The armature 208 is arranged to be adjacent to the axially upper side of the brake core 202 so as to be movable in the axial direction.

The end plate 210 is an annular member arranged to be centered about the axis O and to be spaced away from the armature 208 to axially upward. The end plate 210 is fastened to the brake core 202 via bolts 216.

The hub 212 is fixed to the outer peripheral surface of the rotary shaft 108, and rotates integrally with the rotary shaft 108. A spline fitting part 212a having a concave-convex part extending in the axial direction is formed on an outer peripheral surface of the hub 212.

The friction plate 214 is an annular member arranged to be centered about the axis O, and is disposed between the armature 208 and the end plate 210. A spline fitting part 214a having a concave-convex part extending in the axial direction is formed on an inner peripheral surface of the friction plate 214.

The spline fitting part 214a engages the spline fitting part 212a formed on the outer peripheral surface of the hub 212 so as not to rotate in the circumferential direction with respect to the spline fitting part 212a. Due to this, the friction plate 214 rotates in the circumferential direction together with the rotary shaft 108 and the hub 212.

When the actuation of the braking mechanism 200 is released, the power supply installed outside applies voltage to the coil 204. Due to this, the brake core 202 is excited, thereby the armature 208 is attracted axially downward by the action of a magnetic force. As a result, the armature 208 is moved axially downward against a biasing force generated by the biasing member 206 so as to be adhered to the end face 202c of the brake core 202.

This state is shown in FIG. 3. When the actuation of the braking mechanism 200 is released as shown in FIG. 3, the armature 208 contacts the end face 202c of the brake core 202. In this state, the friction plate 214 is disposed between the armature 208 and the end plate 210 without receiving the biasing force by the biasing member 206.

For example, if the armature 208 is located at axially downward of the friction plate 214, the friction plate 214 comes into contact with the armature 208 by the action of gravity. In this case, the friction plate 214 can rotate in the circumferential direction, and therefore, the braking to the rotary shaft 108 by the braking mechanism 200 is released.

On the other hand, when the braking mechanism 200 is actuated, the application of voltage from the power supply installed outside to the coil 204 is stopped. Due to this, the excitation of the brake core 202 is released, thereby the magnetic force which attracts the armature 208 to axially downward is reduced.

Consequently, as shown in FIG. 2, the armature 208 is moved axially upward by the action of the biasing member 206, thereby the friction plate 214 is held between the armature 208 and the end plate 210. As a result, the rotation of the friction plate 214 in the circumferential direction is braked, thereby the rotation of the rotary shaft 108 is braked.

As the electric motor 100 is operated, adhesive substances such as cutting fluid may enter inside of the braking mechanism 200. If such adhesive substances enter between the end face 202c of the brake core 202 and the armature 208 and harden there, the end face 202c of the brake core 202 and the armature 208 are adhered to each other via the adhesive substances.

In such a case, even if the application of voltage to the coil 204 is stopped in order to actuate the braking mechanism 200, the movement of the armature 208 toward axially upward by the biasing member 206 may be prevented, as a result of which, the braking mechanism 200 cannot properly actuate.

The device 10 according to this embodiment is for inspecting the braking mechanism 200 in order to notify a user of a possibility of the above-described failure in the actuation of the braking mechanism 200. The device 10 will be described below.

The device 10 includes a controller 12, a heating part 14, a display 18, and a storage 20. The controller 12 directly or indirectly controls each component of the device 10. In this embodiment, the controller 12 is electrically connected to the power supply which applies voltage to the coil 104 of the electric motor 100, and controls the voltage applied from the power supply to the coil 104.

Further, the controller 12 is electrically connected to the power supply which applies voltage to the coil 204 of the braking mechanism 200, and controls the voltage applied from the power supply to the coil 204. Thus, in this embodiment, the controller 12 controls the operations of the electric motor 100 and the braking mechanism 200.

As shown in FIG. 2, the heating part 14 is attached to the brake core 202 of the braking mechanism 200. The heating part 14 includes e.g. a resistance heating element, and generates heat in accordance with a command from the controller 12 so as to carry out a heating operation to heat the brake core 202.

A timer 16 is counted an elapsed time from a predetermined time point in accordance with a command from the controller 12. The timer 16 may be built in the controller 12, or may be provided outside of the controller 12. The display 18 includes e.g. an LCD, and displays received image data in accordance with a command from the controller 12.

The storage 20 is comprised of a non-volatile memory such as an EEPROM (registered trademark) in which data can be electrically deleted or recorded, or a random access memory such as a DRAM, a SRAM, etc., in which data can be rapidly read out or written on.

The storage 20 is connected to the controller 12 so as to be able to communicate with it. The controller 12 can record data in the storage 20, or can delete data from the storage 20. The storage 20 may be built in the controller 12 or in an external device (e.g., a server) connected to the controller 12 so as to communicate with it via a network.

Next, the operation of the device 10 will be described. As described above, the device 10 inspects a failure in the actuation of the braking mechanism 200, due to adhesion of adhesive substances to a movable member (e.g., armature 208) of the braking mechanism 200 and to a member (e.g., brake core 202) in contact with the movable member.

Some of the adhesive substances have a property that they liquefy when being heated, and harden when being cooled to a normal temperature after being heated. If such adhesive substances adhere to e.g. a movable member of the braking mechanism 200 and a member in contact with the movable member at a normal temperature in a state where they are solid, no failure in the actuation of the braking mechanism 200 will occur while the adhesive substances remain to be solid at a normal temperature.

However, when the electric motor 100 is operated after adhesion of such adhesive substances, the adhesive substances liquefy and spread out due to increase of the temperature of the electric motor 100. After that, when the operation of the electric motor 100 is stopped, the adhesive substances are cooled to a normal temperature and harden there. As a result, a failure in the actuation of the braking mechanism 200 may occur.

According to the device 10 of this embodiment, in order to inspect such a failure in the actuation of the braking mechanism 200 caused by adhesive substances having the above-described property, the controller 12 heats the braking mechanism 200 by the heating part 14 so as to increase the temperature of the braking mechanism 200 to a temperature at which the adhesive substances liquefy.

Subsequently, the controller 12 stops the heating operation of the heating part 14 so as to decrease the temperature of the braking mechanism 200 to a temperature at which the adhesive substances harden. In this state, the controller 12 actuates the braking mechanism 200 and measures an actuation delay of the braking mechanism 200 at this time.

By carrying out these operations, the device 10 according to this embodiment detects a failure in the actuation of the braking mechanism 200 caused by the adhesive substances having the above-described property.

Figure 4:
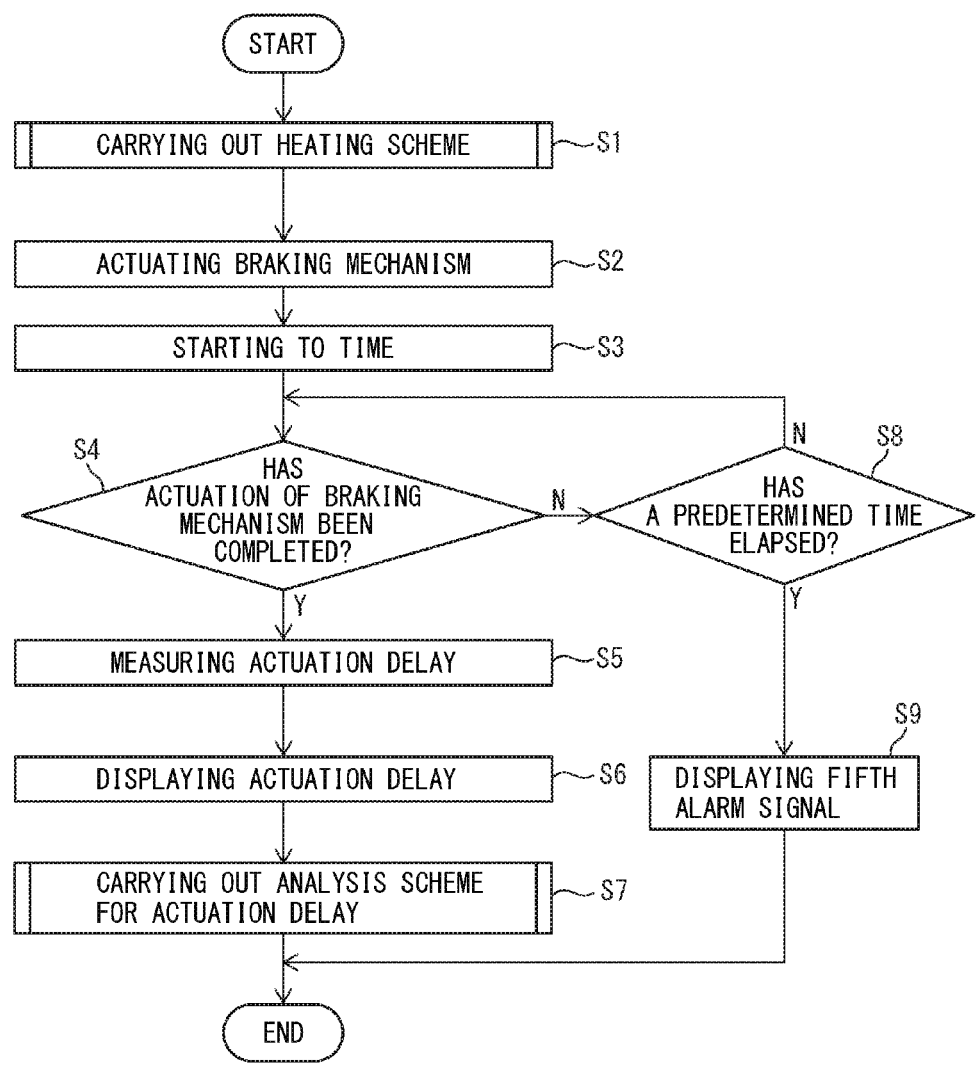
FIG. 4 is a flowchart of an example of an operation flow of the device shown in FIG. 1.
Figure 5:
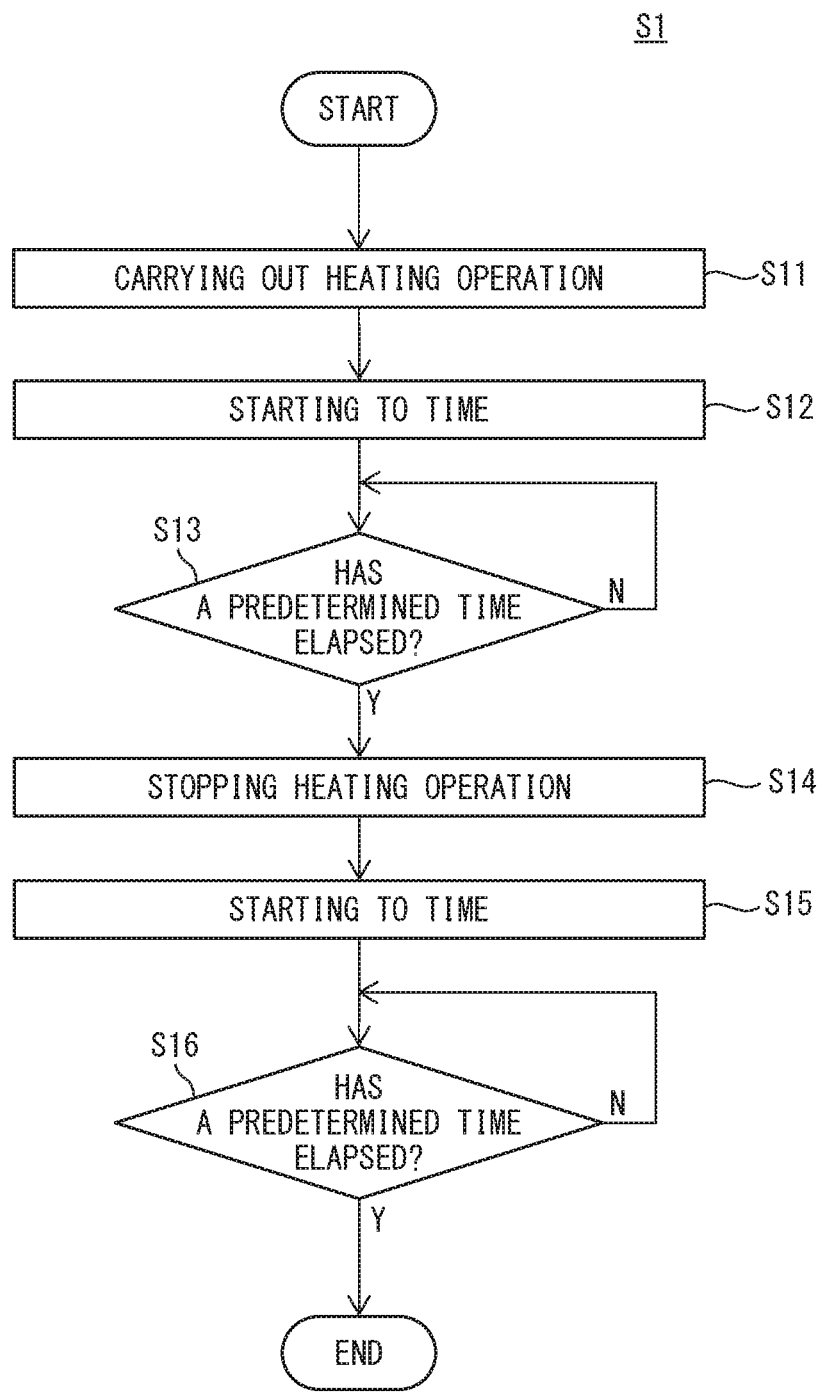
FIG. 5 is a flowchart of an example of a flow of step S1 in FIG. 4.
Figure 6:
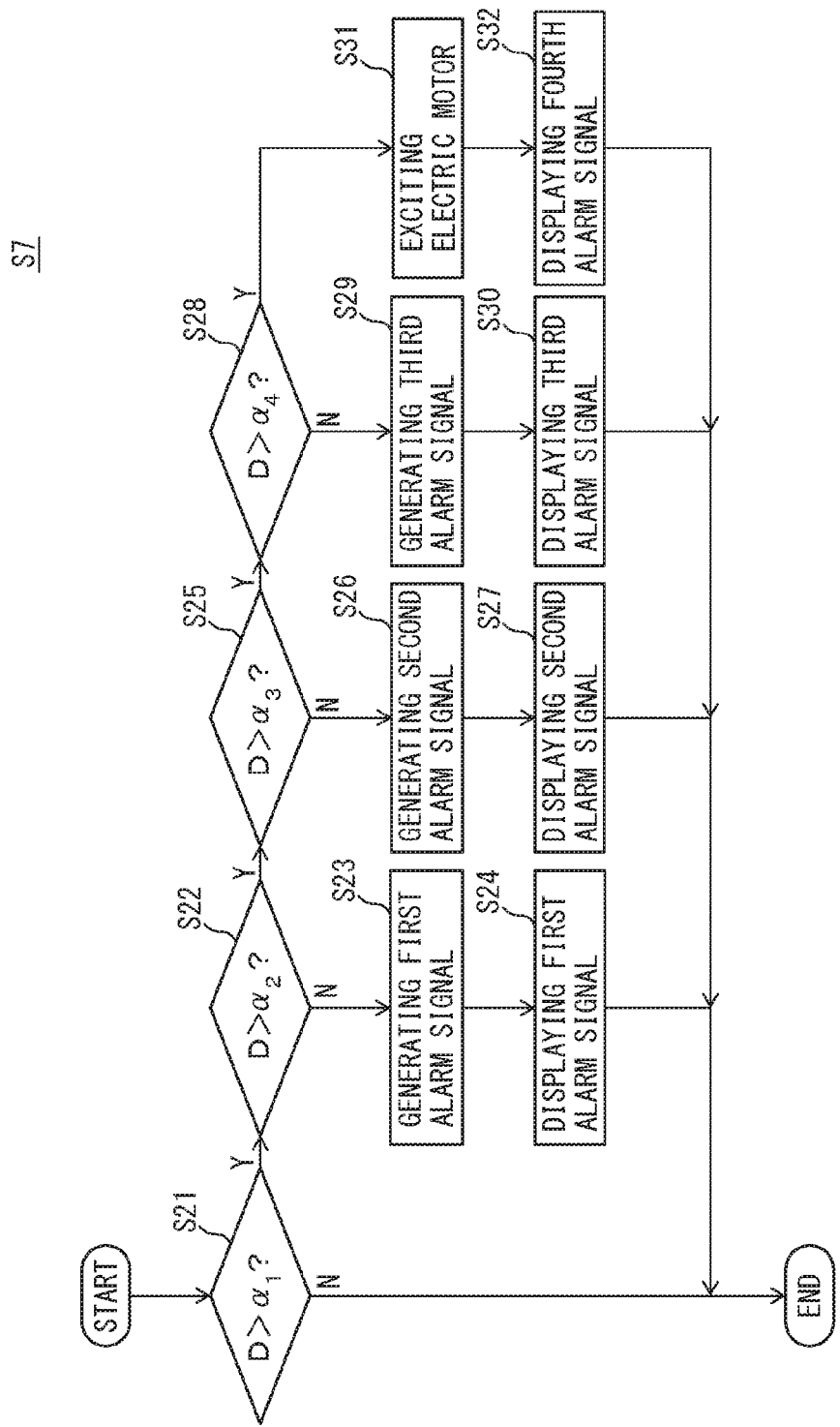
FIG. 6 is a flowchart of an example of a flow of step S7 in FIG. 4.

Next, with reference to FIGS. 4 to 6, the operation flow of the device 10 will be specifically described. The operation flow shown in FIG. 4 is started when the controller 12 receives an inspection command for inspecting the braking mechanism 200 from a user, host controller, or program.

Note that, the inspection command may be transmitted to the controller 12, when the power supply of the electric motor 100 is turned on or off, at the start or end of working hours, or when the electric motor 100 is brought into a long-time pause mode.

When the operation flow shown in FIG. 4 is started, the controller 12 releases the actuation of the braking mechanism 200. Specifically, the controller 12 causes the above-described power supply to apply voltage to the coil 204 of the braking mechanism 200. Due to this, as shown in FIG. 3, the armature 208 is adhered to the end face 202c of the brake core 202, and the biasing force by the biasing member 206 is not applied to the friction plate 214.

At step S1, the controller 12 carries out a heating scheme. This Step S1 will be described below with reference to FIG. 5.

At step S11, the controller 12 carries out a heating operation by the heating part 14. Specifically, the controller 12 sends a command to the heating part 14 so as to generate heat at the heating part 14 to heat the brake core 202. Thus, in this embodiment, the controller 12 functions as a heat controller 22 (FIG. 1) which controls the heating operation of the heating part 14.

At step S12, the controller 12 starts to time an elapsed time. Specifically, the controller 12 sends a first timing-start-command to the timer 16. The timer 16 times an elapsed time $t_1$ from a time point when it receives the first timing-start-command from the controller 12.

At step S13, the controller 12 determines whether the elapsed time $t_1$ timed by the timer 16 reaches a predetermined first time $t_a$. The first time $t_a$ is a parameter for providing a period ($=t_a$) for carrying out the heating operation started at step S11, and is pre-stored in the storage 20.

The first time $t_a$ is predetermined by a user as a time for which the temperature of the braking mechanism 200 can be increased by the heating operation at step S11 to a temperature at which the adhesive substances liquefy as described above. The first time $t_a$ can be obtained by e.g. an experimental or simulation method.

When the controller 12 determines that the elapsed time $t_1$ reaches the first time $t_a$ (i.e., determines "YES") at this step S13, it proceeds to step S14. When it is determined "YES" at this step S13, the braking mechanism 200 is heated to a temperature at which the adhesive substances liquefy. On the other hand, when the controller 12 determines that the elapsed time $t_1$ does not reach the first time $t_a$ (i.e., determines "NO"), the controller 12 repeats step S13.

At step S14, the controller 12 stops the heating operation by the heating part 14. Specifically, the controller 12 sends a command to the heating part 14 so as to stop heat generation at the heating part 14, thereby the operation of heating the brake core 202 is stopped.

At step S15, the controller 12 starts to time an elapsed time. Specifically, the controller 12 sends a second timing-start-command to the timer 16. The timer 16 times an elapsed time $t_2$ from a time point when it receives the second timing-start-command from the controller 12.

At step S16, the controller 12 determines whether the elapsed time $t_2$ timed by the timer 16 reaches a predetermined second time $t_b$. The second time $t_b$ is a parameter for providing an elapsed time from a time point when the heating operation is stopped at step S14, and is pre-stored in the storage 20.

The second time $t_b$ is predetermined by a user as a time for which the temperature of the braking mechanism 200 can be decreased to a temperature (e.g., atmospheric temperature) at which the liquefied adhesive substances harden. The second time $t_b$ can be obtained by e.g. an experimental or simulation method.

When the controller 12 determines that the elapsed time $t_2$ reaches the second time $t_b$ (i.e., determines "YES"), it ends the flow of step S1, and proceeds to step S2 shown in FIG. 4. When it is determined "YES" at this step S16, the adhesive substances, which have adhered to the braking mechanism 200 and liquefied there, harden. On the other hand, the controller 12 repeats step S16 when it determines that the elapsed time $t_2$ does not reach the second time $t_b$ (i.e., determines "NO").

Referring again to FIG. 4, at step S2, the controller 12 actuates the braking mechanism 200. Specifically, the controller 12 sends a command to the power supply installed outside so as to stop the application of voltage from the power supply to the coil 204.

Due to this, a magnetic force for attracting the armature 208 toward the brake core 202 is decreased, thereby the armature 208 tends to move axially upward due to the biasing force generated by the biasing member 206. Thus, in this embodiment, the controller 12 functions as a brake controller 24 (FIG. 1) which actuates the braking mechanism 200.

At step S3, the controller 12 starts to time an elapsed time. Specifically, the controller 12 sends a third timing-start-command to the timer 16. The timer 16 times an elapsed time $t_3$ from a time point when it receives the third timing-start-command from the controller 12.

At step S4, the controller 12 determines whether the actuation of the braking mechanism 200 is appropriately completed. As an example, the controller 12 monitors both-end voltage of the coil 204 of the braking mechanism 200, after the start of step S2.

In this respect, when the armature 208 is moved axially upward b; the biasing member 206 so as to be detached from the end face 202c of the brake core 202, the inductance of the coil 204 changes, as a result of which, both-end voltage of the coil 204 slightly changes.

In other words, when such a slight change in voltage is detected, it is possible to estimate that the armature 208 is detached from the end face 202c of the brake core 202 so that the friction plate 214 is held between the armature 208 and the end plate 210, thereby the actuation of the braking mechanism 200 is completed.

In this embodiment, at this step S4, the controller 12 determines that the actuation of the braking mechanism 200 is appropriately completed (i.e., determines "YES") when the above-described slight change in voltage is detected, and proceeds to step S5.

On the other hand, the controller 12 determines that the actuation of the braking mechanism 200 is not appropriately completed (i.e., determines "NO") when the above-described slight change in voltage is not detected, and proceeds to step S8.

At step S5, the controller 12 measures an actuation delay D of the braking mechanism 200. Specifically, the controller 12 acquires from the timer 16, which has started to time the elapsed time $t_3$ at step S3, an elapsed time $t_3'$ at a time point when the controller 12 has determines "YES" at step S4.

The elapsed time $t_3'$ corresponds to an elapsed time from a time point when the controller 12 sends the command to the power supply for the coil 204 at step S2 to a time point when the armature 208 is detached from the end face 202c of the brake core 202 so as to hold the friction plate 214 (or the rotary shaft 108).

In this embodiment, the controller 12 measures the elapsed time $t_3'$ as the actuation delay D ($=t_3'$ [sec.]) of the braking mechanism 200 when the braking mechanism 200 is actuated at step S2.

The controller 12 records the measured actuation delay D in the storage 20. Thus, in this embodiment, the controller 12 functions as an actuation delay measuring part 26 (FIG. 1) which measures the actuation delay D of the braking mechanism 200.

At step S6, the controller 12 displays the actuation delay D measured at step S5. Specifically, the controller 12 generates image data representing the actuation delay D measured at step S5.

Figure 7:
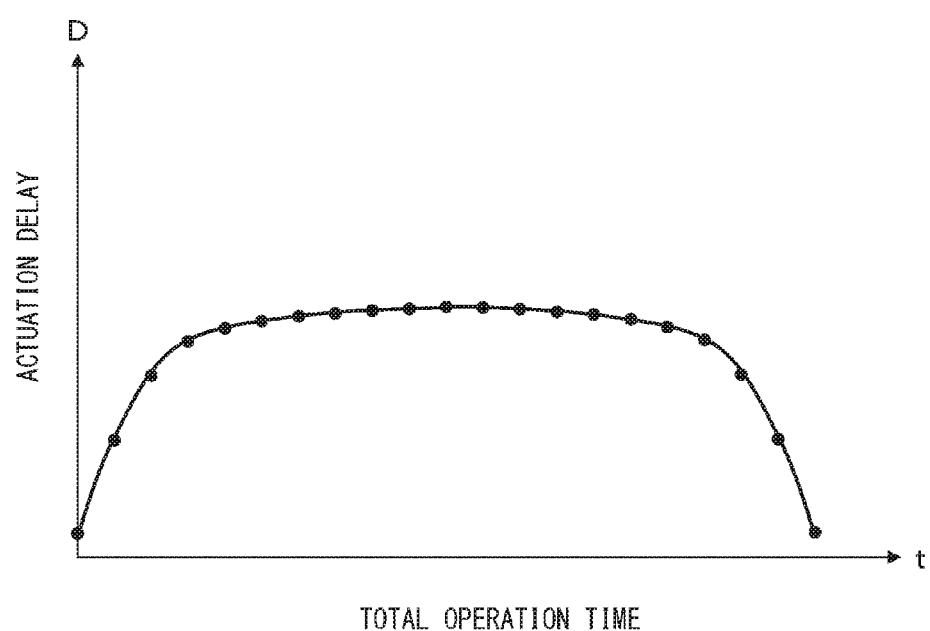
FIG. 7 as a graph illustrating a relationship between a total operation time of an electric motor and an actuation delay thereof.

As an example, the controller 12 generates an image of a graph shown in FIG. 7 as image data representing the actuation delay D. The graph shown in FIG. 7 indicates a relationship between a total operation time "t" of the electric motor 100 and the actuation delay D.

Thus, in this embodiment, the controller 12 functions as an image generating part 30 (FIG. 1) which generates image data representing the actuation delay D. The controller 12 sends the generated image data to the display 18, and then the display 18 displays the received image data. Due to this, the user can monitor the actuation delay D of the braking mechanism 200 as needed.

At step S7, the controller 12 carries out an analysis scheme for the actuation delay D. Step S7 will be described below with reference to FIG. 6.

At step S21, the controller 12 compares the actuation delay D measured at step S5 with a first reference value $\alpha_1$, and determines whether the actuation delay D is greater than the first reference value $\alpha_1$.

The first reference value $\alpha_1$ is set for an actuation delay of the braking mechanism 200 caused by the adhesion of the above-described adhesive substances, and is previously stored in the storage 20. In this embodiment, since the elapsed time $t_3'$ is measured as the actuation delay D, the first reference value $\alpha_1$ is set as a time (e.g., 0.1 sec.).

At this step S21, the controller 12 reads out the actuation delay D measured at step 55 and the first reference value $\alpha_1$ from the storage 20, and compares the actuation delay D with the first reference value $\alpha_1$. Thus, in this embodiment, the controller 12 functions as a comparison part 28 (FIG. 1) which compares the actuation delay D with the reference value $\alpha_1$.

When the controller 12 determines that the actuation delay D is greater than the first reference value $\alpha_1$ (i.e., determines "YES") after the comparison of the actuation delay D with the reference value $\alpha_1$, it proceeds to step S22. On the other hand, when the controller 12 determines that the actuation delay D is smaller than or equal to the first reference value $\alpha_1$ (i.e., determines "NO"), it ends step S7 shown in FIG. 4.

At step S22, the controller 12 compares the actuation delay D measured at step S5 with a second reference value $\alpha_2$, and determines whether the actuation delay D is greater than the second reference value $\alpha_2$. The second reference value $\alpha_2$ is set to be greater than the first reference value $\alpha_1$ (e.g., $\alpha_2$=0.3 sec.), and is pre-stored in the storage 20.

When the controller 12 determines that the actuation delay D is greater than the second reference value $\alpha_2$ (i.e., determines "YES"), it proceeds to step S25. On the other hand, when the controller 12 determines that the actuation delay D is smaller than or equal to the second reference value $\alpha_2$ (i.e., determines "NO"), it proceeds to step S23.

At step S23, the controller 12 generates a first alarm signal. As an example, the controller 12 generates the first alarm signal in the form of image data indicating "Symptom of braking actuation delay is detected. Next inspection should be carried out within two weeks".

Thus, in this embodiment, the controller 12 functions as an alarm generating part 32 (FIG. 1) which generates an alarm signal when it detects that the actuation delay D is greater than the reference value $\alpha_2$.

At step S24, the controller 12 displays the first alarm signal. Specifically, the controller 12 sends the first alarm signal generated at step S23 to the display 18. The display 18 displays the received first alarm signal as an image indicating "Symptom of braking actuation delay is detected. Next inspection should be carried out within two weeks", so as to notify the user of it.

At step S25, the controller 12 compares the actuation delay D measured at step S5 with a third reference value $\alpha_3$, and determines whether the actuation delay D is greater than the third reference value $\alpha_3$. The third reference value $\alpha_3$ is set to be greater than the second reference value $\alpha_2$ (e.g., $\alpha_3$=0.5 sec.), and is pre-stored in the storage 20.

When the controller 12 determines that the actuation delay D is greater than the third reference value $\alpha_3$ (i.e., determines "YES"), it proceeds to step S28. On the other hand, when the controller 12 determines that the actuation delay D is smaller than or equal to the third reference value $\alpha_3$ (i.e., determines "NO"), it proceeds to step S26.

At step S26, the controller 12 generates a second alarm signal. As an example, the controller 12 generates the second alarm signal in the form of image data indicating "Replacing brake at an early date is recommended. Next inspection should be carried out within next two days".

At step S27, the controller 12 sends the second alarm signal generated at step S26 to the display 18. The display 18 displays the received second alarm signal as an image indicating "Replacing brake at an early date is recommended. Next inspection should be carried out within next two days", so as to notify a user of it.

At step S28, the controller 12 compares the actuation delay D measured at step S5 with an acceptable value $\alpha_4$, and determines whether the actuation delay D is greater than the acceptable value $\alpha_4$. The acceptable value $\alpha_4$ is set to be greater than the third reference value $\alpha_3$ (e.g., $\alpha_4$=1 sec.), and is pre-stored in the storage 20.

For example, the acceptable value $\alpha_4$ is a limit value of the actuation delay D, which may cause an accident (e.g., a damage of a workpiece or jig) if the actuation delay D is greater than the acceptable value $\alpha_4$.

When the controller 12 determines that the actuation delay D is greater than the acceptable value $\alpha_4$ (i.e., determines "YES"), it proceeds to step S31. On the other hand, when the controller 12 determines that the actuation delay D is smaller than or equal to the acceptable value $\alpha_4$ (i.e., determines "NO"), it proceeds to step S29.

At step S29, the controller 12 generates a third alarm signal. As an example, the controller 12 generates the third alarm signal in the form of image data indicating "This state would be danger. Replace electric motor immediately".

At step S30, the controller 12 sends the third alarm signal generated at step S29 to the display 18. The display 18 displays the received third alarm signal as an image indicating "This state would be danger. Replace electric motor immediately", so as to notify a user of it.

At step S31, the controller 12 excites the electric motor 100. Specifically, the controller 12 sends a command to the power supply for applying voltage to the coil 104 of the electric motor 100, so as to apply the voltage to the coil 104.

Due to this, the stator 102 of the electric motor 100 is excited, and thereby the position of the rotor 106 of the electric motor 100 in the axial direction can be appropriately maintained by a magnetic field generated by the excitation of the stator 102. Thus, in this embodiment, the controller 12 functions as an excitation controller 34 (FIG. 1) which excites the electric motor 100.

At step S32, the controller 12 displays a fourth alarm signal. As an example, the controller 12 generates the fourth alarm signal in the form of image data indicating "Actuation delay exceeds acceptable value. Replace electric motor immediately", and sends it to the display 18. The display 18 displays the received fourth alarm signal so as to notify a user of it.

Referring again to FIG. 4, when it is determines "NO" at step S4, at step S8, the controller 12 determines whether the elapsed time $t_3$ from the start of timing at step S3 reaches a predetermined third time $t_c$. In this embodiment, the third time $t_c$ is set to be greater than the acceptable value $\alpha_4$ (e.g., $t_c$=2 sec.), and is pre-stored in the storage 20.

When the controller 12 determines that the elapsed time $t_3$ reaches the third time $t_c$ (i.e., determines "YES"), it proceeds to step S9. On the other hand, when the controller 12 determines that the elapsed time $t_3$ does not reach the third time $t_c$ (i.e., determines "NO"), it returns to step S4.

At step S9, the controller 12 displays a fifth alarm signal. As an example, the controller 12 generates the fifth alarm signal in the form of image data indicating "The brake has failed. Replace electric motor immediately", and sends it to the display 18. The display 18 displays the received fifth alarm signal so as to notify a user of it.

As described above, in this embodiment, the controller 12 heats the braking mechanism 200, then decreases the temperature of the braking mechanism 200, and then measures the actuation delay D of the braking mechanism 200. According to this configuration, it is possible to effectively and previously detect a failure in the actuation of the braking mechanism 200 caused by the adhesive substances having the property that they liquefy when being heated and harden when being cooled to a normal temperature.

Further, in this embodiment, the controller 12 compares the measured actuation delay D with the reference value $\alpha_1$, $\alpha_2$ or $\alpha_3$, and sends an alarm to a user when the actuation delay D exceeds the reference value $\alpha_1$, $\alpha_2$ or $\alpha_3$.

According to this configuration, the user can automatically and intuitively recognize the possibility that the adhesive substances having the above-described property may cause a delay in the actuation of the braking mechanism 200.

Further, in this embodiment, the controller 12 compares the measured actuation delay D with the different reference values $\alpha_1$, $\alpha_2$, and $\alpha_3$, sequentially (steps S21, S22, and S25), and sends different alarms to a user in response to the magnitude of the actuation delay D (steps S24, S27, and S30).

According to this configuration, the user can automatically and intuitively recognize a risk level at which the actuation delay D due to the adhesive substances may cause an accident (e.g., a damage of a workpiece or jig).

Further, in this embodiment, the controller 12 measures, as the actuation delay D, the elapsed time $t_3$' from the time point when the braking mechanism 200 is actuated at step S2 to a time point when the actuation of the braking mechanism 200 is completed. (i.e., when determining "YES" at step S4). According to this configuration, it is possible to accurately measure the actuation delay D by a simple program.

Further, in this embodiment, the controller 12 heats the braking mechanism 200 by the heating part 14 for a predetermined period $t_a$, and cools it under a normal temperature for a predetermined period $t_b$ after stopping the heating operation.

By this operation, adhesive substances, which have adhered to the braking mechanism 200, liquefy when being heated and then harden when being cooled. Such a scheme can be executed by a relatively simple program, and therefore, the amount of computation when the scheme is executed by the controller 12 can be reduced, which is advantageous for automation of the operation flow of the device 10.

Further, in this embodiment, the controller 12 compares the measured actuation delay D with the acceptable value $\alpha_4$, and sends an alarm to a user when the actuation delay D exceeds the acceptable value $\alpha_4$.

According to this configuration, the user can automatically and intuitively recognize that there is a high risk of an accident due to a failure in the actuation of the braking mechanism 200 caused by the adhesive substances having the above-described property.

Further, in this embodiment, the controller 12 excites the electric motor 100 when the actuation delay D exceeds the acceptable value $\alpha_4$ (step S31), so as to maintain the position of the rotor 106 of the electric motor 100 in the axial direction at a predetermined position.

According to this configuration, even if the braking mechanism 200 is not actuated properly and the friction plate 214 cannot be held between the armature 208 and the end plate 210, it is possible to prevent an accident that the rotor 106 of the electric motor 100 displaces in the axial direction so as to collide a workpiece or jig.

Next, with reference to FIGS. 8 and 9, a device 50 according to another embodiment of the invention will be described. Note that, in this embodiment, elements similar to those of the above-mentioned embodiment are assigned the same reference numerals, and detailed explanations thereof wild be omitted.

The device 50 is for inspecting the braking mechanism 200 which holds the rotary shaft 108 of the electric motor 100. In this embodiment, the rotary shaft 108 of the electric motor 100 extends in a vertical direction (i.e., gravity direction), and holds an object at its lower end.

This object is e.g. a ball screw mechanism which moves a work table of a machining center (NC machine tool) in the vertical direction. Accordingly, a load is applied to the rotary shaft 108 in the gravity direction. Thus, the rotary shaft 108 according to this embodiment is a so-called gravity axis, in which the rotation axis O thereof substantially coincides with the gravity direction.

In this embodiment, as shown in FIG. 9, the above-mentioned heating part 14 is not attached to the braking mechanism 200, and the braking mechanism 200 is arranged just below the electric motor 100 so as to be adjacent, to the electric motor 100.

The device 50 includes a controller 52, a temperature detecting part 54, a displacement detecting part 56, a display 18, and a storage 20. The controller 52 directly or indirectly controls each component of the device 50.

In this embodiment, the controller 52 is electrically connected to a power supply for applying voltage to the coil 104 of the electric motor 100, and controls the voltage applied from the power supply to the coil 104. Further, the controller 52 is electrically connected to a power supply for applying voltage to the coil 204 of the braking mechanism 200, and controls the voltage applied from the power supply to the coil 204.

The temperature detecting part 54 includes a temperature sensor such as a platinum resistance temperature detector or a thermocouple, and is attached to the brake core 202 of the braking mechanism 200. The temperature detecting part 54 measures a temperature at a position, to which the temperature detecting part 54 is installed, in response to a command from the controller 52, and sends data of the measured temperature to the controller 52.

The displacement detecting part 56 is arranged to be adjacent to the rotary shaft 108, and detects a displacement of the rotary shaft 108 in the axial direction (i.e., vertical direction). The displacement detecting part 56 includes e.g. a displacement sensor or a pulse coder which detects the rotation of the rotary shaft 108. The displacement detecting part 56 detects the displacement of the rotary shaft 108 in the axial direction in response to a command from the controller 52, and sends data of the measured displacement to the controller 52.

Figure 10:
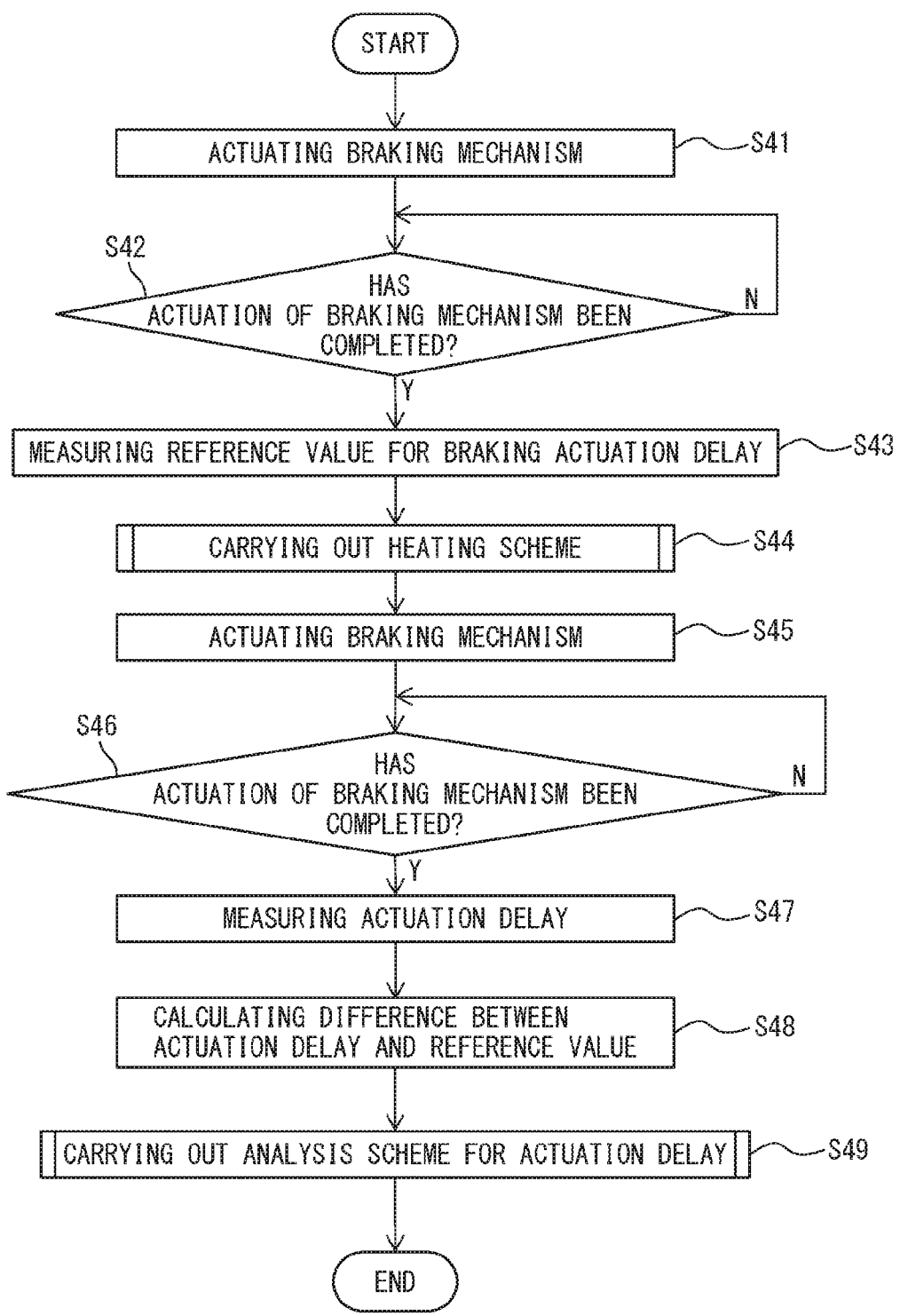
FIG. 10 is a flowchart of an example of an operation flow of the device shown in FIG. 8.

Next, with reference to FIGS. 10 and 11, an operation flow of the device 50 will be described. The operation flow shown in FIG. 10 is started when the controller 52 receives the above-described inspection command from a user, host controller, or program. When the operation flow shown in FIG. 10 is started, the controller 52 releases the actuation of the braking mechanism 200, and excites the electric motor 100.

At step S41, the controller 52 functions as the brake controller 24 so as to actuate the braking mechanism 200, similar as the above-mentioned step S2. Specifically, the controller 52 sends a command to the power supply for the coil 204 so as to apply voltage to the coil 204.

At the start of this step S41, the controller 52 also releases the excitation of the electric motor 100. Specifically, the controller 52 sends a command to the power supply for the coil 104 of the electric motor 100 so as to stop to apply the voltage to the coil 104, thereby the excitation of the electric motor 100 is released.

At step S42, the controller 52 determines whether the actuation of the braking mechanism 200 is appropriately completed, similar as the above-mentioned step S4. When the controller 52 determines "YES", it excites the electric motor 100 again, and proceeds to step S43. On the other hand, the controller 52 repeats step S42 when determining "NO".

At step S43, the controller 52 measures a reference value $\alpha_5$ for a braking actuation delay. Specifically, the controller 52 acquires from the displacement detecting part 56 the displacement of the rotary shaft 108 in the axial direction, which occurs within a period from a time point when step S41 is started to a time point when it is determined "YES" at step S42.

As an example, the controller 52 sends a command to the displacement detecting part 56 at each of time points when the controller 52 sends the command to the power supply for the coil 204 at step S41 and when the controller 52 determines "YES" at step S42, so as to detect the position of the rotary shaft 108 in the axial direction. Then, the controller 52 calculates, as the displacement, the difference between the positions of the rotary shaft 108 in the axial direction, which have been detected at these two time points.

As described above, the controller 52 releases the excitation of the electric motor 100 from the time point when step S41 is started (or a little time has passed from the start of step S41) to the time point when it is determined "YES" at step S42.

Therefore, if there is a time difference between these two time points, the friction plate 214 is not held between the armature 208 and the end plate 210 in this period of time. In this instance, the rotary shaft 108 of the electric motor 100 may move downward in the vertical direction by the action of the load applied to the rotary shaft 108.

In this embodiment, the controller 52 measures the thus-occurred displacement of the rotary shaft 108 in the axial direction, as an actuation delay of the braking mechanism 200.

The actuation delay of the braking mechanism 200 (i.e., the displacement of the rotary shaft 108 in the axial direction) measured at this step S43 is an actuation delay when the braking mechanism 200 is actuated before the braking mechanism 200 is heated at step S44 described later.

This embodiment makes use of the actuation delay measured before heating the braking mechanism 200 as the reference value $\alpha_5$ for determining whether an actuation delay measured after heating the braking mechanism 200 is appropriate. The controller 52 stores the actuation delay measured at this step S43 in the storage 20, as the reference value $\alpha_5$ (unit: [mm]).

At step S44, the controller 52 carries out a heating scheme. This step S44 will be described with reference to FIG. 11.

At step S61, the controller 52 carried out a heating operation. In this embodiment, the controller 52 applies voltage to the coil 104 of the electric motor 100 so as to cause the coil 104 to generate heat, thereby heats the braking mechanism 200 by the heat of the coil 104.

Specifically, the controller 52 sends a command to the power supply for applying voltage to the coil 104 of the electric motor 100 so as to apply the voltage to the coil 104. At this time, the controller 52 may send a speed command to the electric motor 100 so as to rotate the rotor 106 at a predetermined rotation speed.

When the voltage is applied to the coil 104 and the coil 104 generates heat, the heat generated at the coil 104 is conducted to the braking mechanism 200 arranged just below the electric motor 100. As a result, the braking mechanism 200 is heated.

Thus, in this embodiment, the coil 104 of the electric motor 100 functions as a heating part which heats the braking mechanism 200. Further, the controller 52 functions as a heat controller 58 (FIG. 8) which controls the heating operation of the heating part.

At step S62, the controller 52 determines whether the temperature T of the braking mechanism 200 increases to a predetermined first temperature $T_a$. Specifically, the controller 52 acquires data of the temperature T from the temperature detecting part 54, and determines whether the acquired temperature T increases to the first temperature $T_a$.

The first temperature $T_a$ is predetermined by a user as a temperature at which adhesive substances adhered to the braking mechanism 200 can liquefy, and is pre-stored in the storage 20.

When the controller 52 determines that the temperature T increases to the first temperature $T_a$ (i.e., determines "YES"), it proceeds to step S63. On the other hand, when the controller 52 determines that the temperature T does not reach the first temperature $T_a$ (i.e., determines "NO"), it repeats step S62.

At step S63, the controller 52 stops the heating operation. Specifically, the controller 52 sends a command to the power supply so as to stop the application of the voltage to the coil 104 of the electric motor 100.

At step S64, the controller 52 determines whether the temperature T of the braking mechanism 200 decreases to a predetermined second temperature $T_b$. Specifically, the controller 52 determines whether the temperature T acquired from the temperature detecting part 54 decreases to the second temperature $T_b$.

The second temperature $T_b$ is predetermined by a user as a temperature at which the liquefied adhesive substances can harden, and is pre-stored in the storage 20.

When the controller 52 determines that the temperature T decreases to the second temperature $T_b$ (i.e., determines "YES"), it ends step S44 and proceeds to step S45 shown in FIG. 10. On the other hand, when the controller 52 determines that the temperature T does not decrease to the second temperature $T_b$ (i.e., determines "NO"), it repeats step S64.

Referring again to FIG. 10, at step S45, the controller 52 functions as the brake controller 24 so as to actuate the braking mechanism 200, similar as the above-mentioned step S41. At this time, the controller 52 releases the excitation of the electric motor 100.

At step S46, the controller 52 determines whether the actuation of the braking mechanism 200 is appropriately completed, similar as the above-mentioned step S42. The controller 52 proceeds to step S47 when determining "YES". On the other hand, the controller 52 repeats step S46 when determining "NO".

At step S47, the controller 52 measures a braking actuation delay D. Specifically, the controller 52 acquires from the displacement detecting part 56 the displacement of the rotary shaft 108 in the axial direction, which occurs within a period from a time point when the controller 52 sends the command to the power supply for the coil 204 at step S45 to a time point when the controller 52 determines "YES" at step S46.

In this respect, the controller 52 releases the excitation of the electric motor 100 from a time point when it sends the command to the power supply for the coil 204 at step S45 (or when a little time has passed from the transmission of the command) to a time point when it is determined "YES" at step S46. Accordingly, the displacement of the rotary shaft 108 in the axial direction corresponds to an actuation delay when the braking mechanism 200 is actuated after the braking mechanism 200 is heated.

The controller 52 measures, as the actuation delay D of the braking mechanism 200 (unit: [mm]), the acquired displacement of the rotary shaft 108 in the axial direction, and stores it in the storage 20. Thus, the controller 52 functions as an actuation delay measuring part 60 (FIG. 8) which measures the actuation delay D.

At step S48, the controller 52 compares the actuation delay D with the reference value $\alpha_5$, and calculates a difference $\delta_D$ between the actuation delay D and the reference value $\alpha_5$. Specifically, the controller 52 reads out the reference value $\alpha_5$ measured at step S43 and the actuation delay D measured at step S47 from the storage 20, and compares them with each other so as to calculate the difference $\delta_D=D-\alpha_5$ (units: mm) between the actuation delay D and the reference value $\alpha_5$.

Thus, in this embodiment, the controller 52 functions as a comparison part 62 (FIG. 8) which compares the actuation delay D with the reference value $\alpha_5$.

At step S49, the controller 52 carries out an analysis scheme for the actuation delay D. This step S49 will be described with reference to FIG. 12. Note that, in the flow shown in FIG. 12, processes similar to those in FIG. 6 is assigned the same reference numerals, and detailed explanations thereof will be omitted.

At step S51, the controller 52 determines whether the difference $\delta_D$ calculated at step S48 is greater than a first threshold value $\alpha_6$. The first threshold value $\alpha_6$ is defined by a user (e.g., 1 mm), and is pre-stored in the storage 20.

When the controller 52 determines that the difference $\delta_D$ is greater than the first threshold value $\alpha_6$ (i.e., determines "YES"), it proceeds to step S52. On the other hand, when the controller 52 determines that the difference $\delta_D$ is smaller than or equal to the first threshold value $\alpha_6$ (i.e., determines "NO"), it ends step S49, and thereby ends the flow shown in FIG. 10.

At step S52, the controller 52 determines whether the difference $\delta_D$ measured at step S48 is greater than a second threshold value $\alpha_7$. The second threshold value $\alpha_7$ is set by a user (e.g., 2 mm), and is pre-stored in the storage 20.

When the controller 52 determines that the difference $\delta_D$ is greater than the second threshold value $\alpha_7$ (i.e., determines "YES"), it proceeds to step S53. On the other hand, when the controller 52 determines that the difference $\delta_D$ is smaller than or equal to the second threshold value $\alpha_7$ (i.e., determines "NO"), it proceeds to step S23.

At step S53, the controller 52 determines whether the difference $\delta_D$ measured at step S48 is greater than a third threshold value $\alpha_8$. The third threshold value $\alpha_8$ is defined by a user (e.g., 3 mm), and is pre-stored in the storage 20.

When the controller 52 determines that the difference $\delta_D$ is greater than the third threshold value $\alpha_8$ (i.e., determines "YES"), it proceeds to step S54. On the other hand, when the controller 52 determines that the difference $\delta_D$ is smaller than the third threshold value $\alpha_8$ (i.e., determines "NO"), it proceeds to step S26.

At step S54, the controller 52 determines whether the difference $\delta_D$ measured at step S48 is greater than an acceptable value $\alpha_9$. The acceptable value $\alpha_9$ is a limit value of the difference $\delta_D$, which may cause an accident (e.g., a damage of a workpiece or jig) if the difference $\delta_D$ exceeds the acceptable value $\alpha_9$. The acceptable value $\alpha_9$ is defined by a user (e.g., 10 mm), and is pre-stored in the storage 20.

When the controller 52 determines that the difference $\delta_D$ is greater than the acceptable value $\alpha_9$ (i.e., determines "YES"), it proceeds to step S31. On the other hand, when the controller 52 determines that the difference $\delta_D$ is smaller than or equal to the acceptable value $\alpha_9$ (i.e., determines "NO"), it proceeds to step S29.

As described above, in this embodiment, the controller 52 heats the braking mechanism 200, then decreases the temperature of the braking mechanism 200, and then measures the actuation delay D of the braking mechanism 200. According to this configuration, it is possible to effectively and previously detect a failure in the actuation of the braking mechanism 200, which is caused by adhesive substances having a property that they liquefy when being heated and harden when being cooled to a normal temperature.

Further, in this embodiment, the controller 52 measures the displacement of the rotary shaft 108 in the axial direction via the displacement detecting part 56, and analyzes the actuation delay of the braking mechanism 200 by making use of the displacement as the actuation delay.

According to this configuration, it is possible to notify a user of a possibility that a failure in the actuation of the braking mechanism 200 due to the adhesion of adhesive substances may cause an accident of drop of the rotary shaft 108, if the rotary shaft 108 is used as a gravity axis.

Further, in this embodiment, the controller 52 uses the actuation delay measured before heating the braking mechanism 200 as the reference value $\alpha_5$ for determining whether the actuation delay measured after heating the braking mechanism 200 is appropriate. According to this configuration, it is possible to effectively detect a failure in the actuation of the braking mechanism 200 caused by adhesive substances having a property that they liquefy when being heated and harden when being cooled to a normal temperature.

Further, in this embodiment, the controller 52 compares the measured actuation delay D with the reference value $\alpha_5$ so as to calculate the difference $\delta_D$, and send different alarms to a user depending on the magnitude of the difference $\delta_D$ (steps S24, S27, and S30).

According to this configuration, a user can automatically and intuitively recognize a risk level at which the actuation delay D due to the adhesive substances may cause an accident (e.g., a damage of a workpiece or jig).

Further, in this embodiment, the coil 104 of the electric motor 100 is used as a heating part which heats the braking mechanism 200. According to this configuration, it is possible to decrease the number of components of the device 50.

Figure 8:
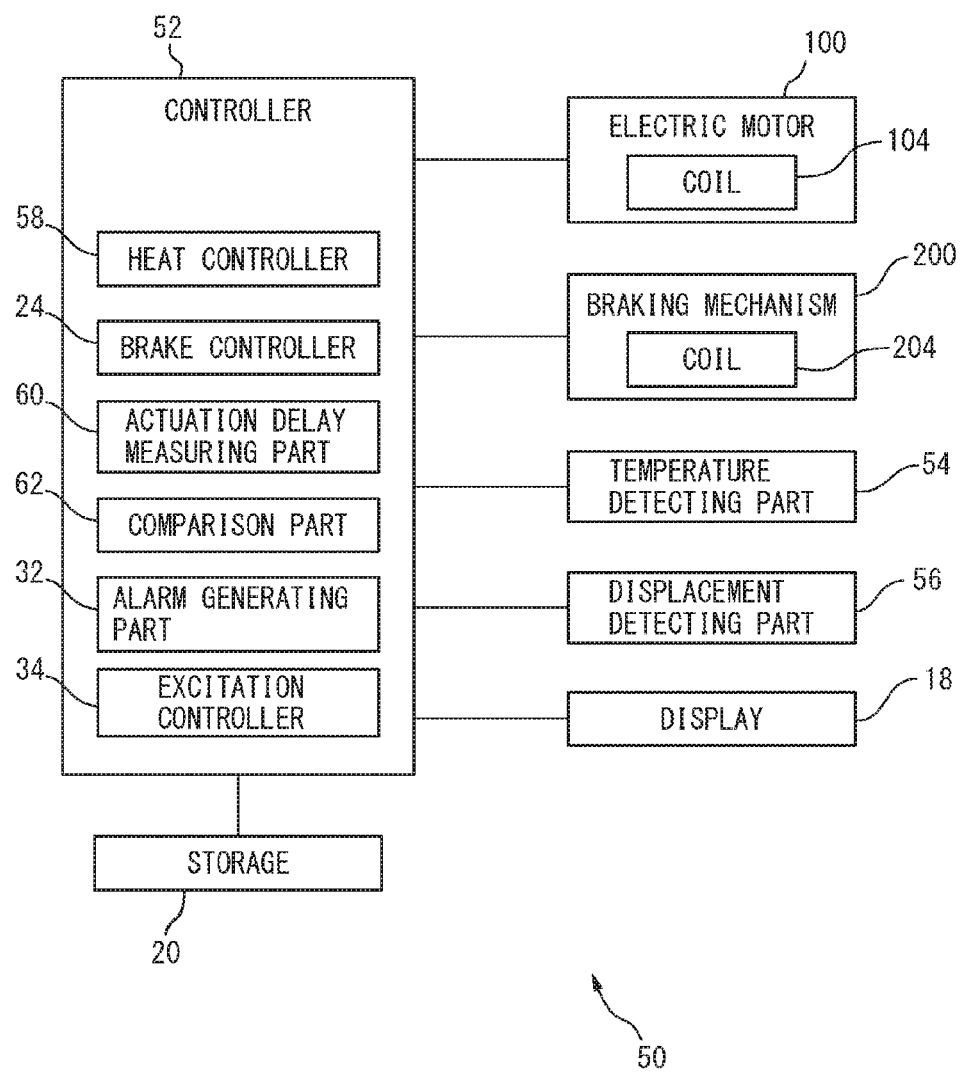
FIG. 8 is a block diagram of a device according to another embodiment of the invention.

Note that, the components of the device 10 shown in FIG. 1 and the components of the device 50 shown in FIG. 8 can be replaced with each other or can be combined.

For example, the temperature detecting part 54 may be provided in the device 10. In this case, the controller 12 may carry out step S44, instead of step S1 shown in FIG. 5. Further, the heating part 14 of the device 10 may be omitted, and the heating part in device 10 may be constituted by the coil 104 of the electric motor 100.

Further, the displacement detecting part 56 may be provided in the device 10, and at step S5 in FIG. 4, the controller 12 may measure, as the actuation delay D, the displacement of the rotary shaft 108 in the axial direction acquired by the displacement detecting part 56, similar as the above-mentioned step S47. In this case, the reference values $\alpha_1$, $\alpha_2$ and $\alpha_3$, and the acceptable value $\alpha_4$, which are used at steps S21, S22, S25 and S28 in FIG. 6, are set for the displacement of the rotary shaft 108 in the axial direction.

Further, the heating part 14 may be provided in the device 50. Further, in the above-mentioned embodiments, the heating part 14 is provided at the brake core 202. However, the heating part 14 may be provided at any position at which the heating part 14 can heat the braking mechanism 200.

Figure 11:
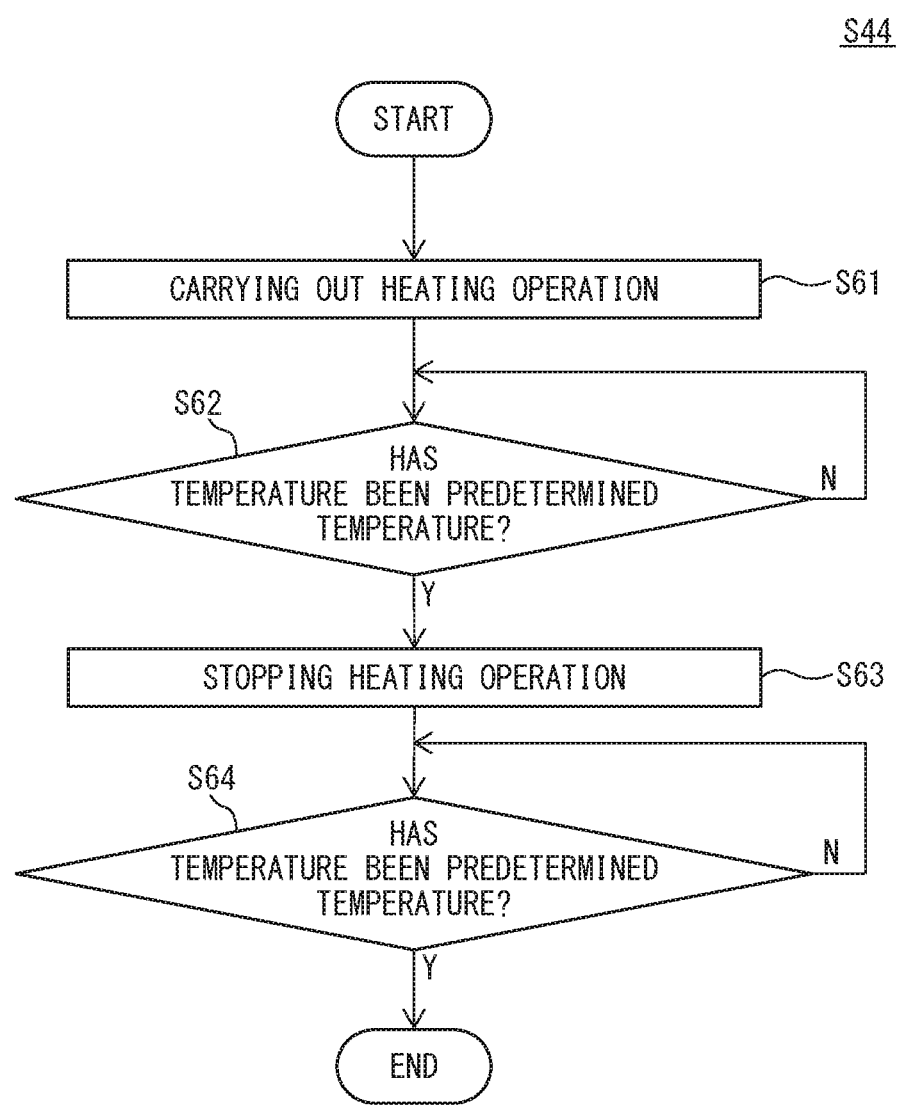
FIG. 11 is a flowchart of an example of a flow of step S44 in FIG. 10.

Further, the timer 16 may be provided in the device 50 in place of the temperature detecting part 54, and the controller 52 may execute step S1 shown in FIG. 5 in place of step S44 shown in FIG. 11. The controller 52 may also execute steps S8 and S9 shown in FIG. 4 when it determines "NO" at step S42 or S46 shown in FIG. 10.

Figure 12:
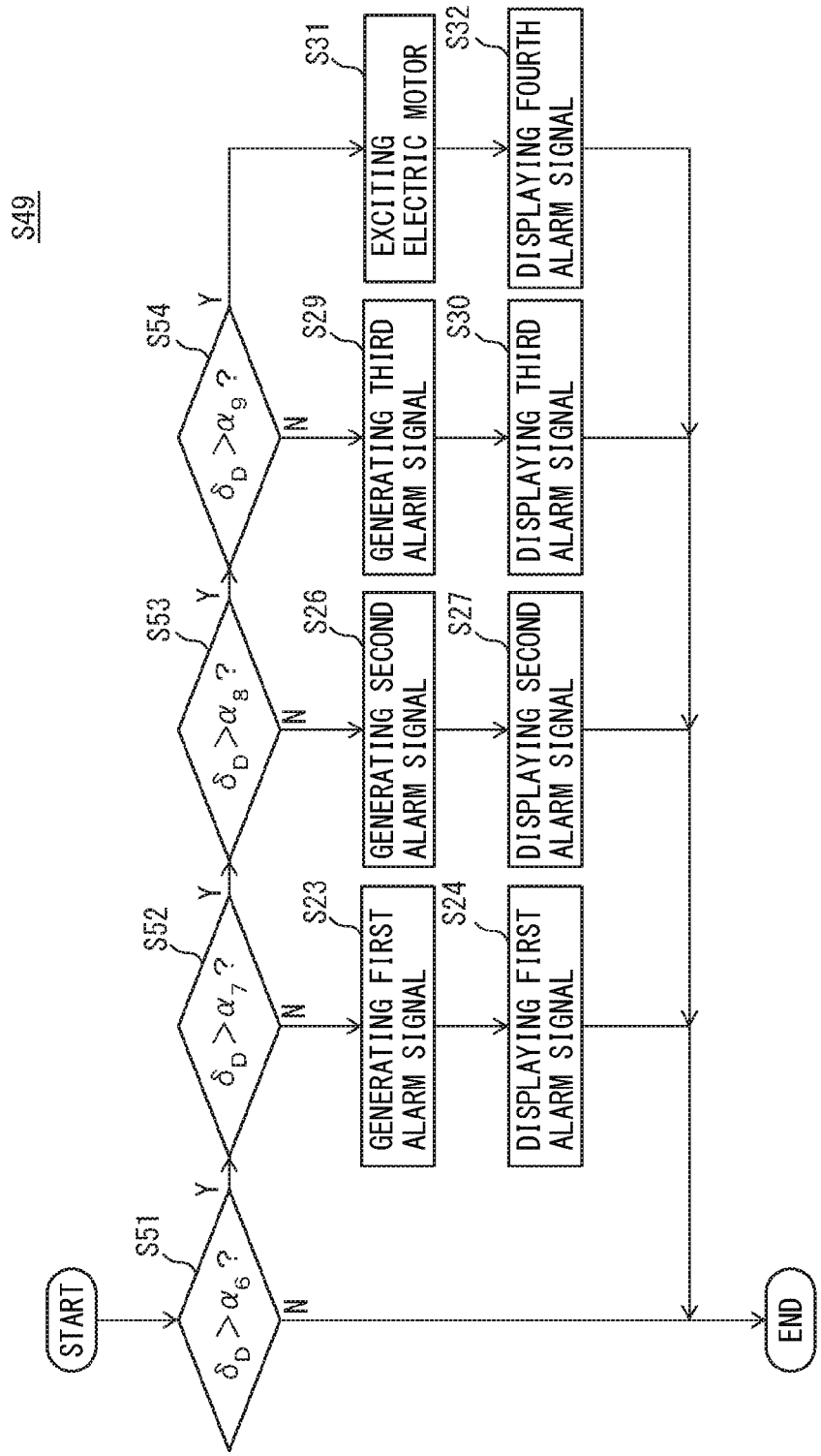
FIG. 12 is a flowchart of an example of a flow of step S49 in FIG. 10.

Further, at steps S43 and S47 in FIG. 10, the controller 52 may measure the elapsed time $t_3'$ timed by the timer 16 as the reference value $\alpha_5$ and the actuation delay D, by a method similar to step S5. In this case, the threshold values $\alpha_6$, $\alpha_7$ and $\alpha_8$, and the acceptable value $\alpha_9$, which are used at step S51, S52, S53 and S54 in FIG. 12, are set as a predetermined time.

Further, at the above-mentioned step S6, the controller 12 generates an image of the graph representing the relationship between the total operation time "t" of the electric motor 100 and the actuation delay D. However, the controller 12 may generate an image of the graph representing a relationship between the actuation delay D and the total moving distance of an object (e.g., a table of a machining center) moved by the electric motor 100, or the total number of rotations of the electric motor 100.

Further, a speaker may be provided in place of (or in addition to) the display 18, and the controller 12 or 52 may generate an alarm signal in the form of audio data, and may output it from the speaker.

Further, the temperature detecting part 54 may be provided at not only the brake core 202 but also any position at which the temperature detecting part 54 can measure the temperature of the braking mechanism 200.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, is the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing is the claims, specification, and drawings, even when the order of operations is described using the terms "first", "next", "subsequently", "then", etc., for convenience, maintaining this order is not necessarily essential for working the inventions.

The invention claimed is:

1. A device for inspecting a braking mechanism which holds a rotary shaft of an electric motor, comprising:
   a heating part which heats the braking mechanism;
   a heat controller which controls a heating operation of the heating part;
   a brake controller which actuates the braking mechanism when the heat controller stops the heating operation and a temperature of the braking mechanism decreases;
   an actuation delay measuring part which measures an actuation delay of the braking mechanism when the brake controller actuates the braking mechanism; and
   a comparison part which compares the actuation delay measured by the actuation delay measuring part with a reference value of the actuation delay of the braking mechanism.

2. The device according to claim 1, wherein the brake controller further actuates the braking mechanism before the heating operation, wherein
   the actuation delay measuring part measures, as the reference value, an actuation delay of the braking mechanism when the brake controller actuates the braking mechanism before the heating operation.

3. The device according to claim 1, wherein the reference value is previously stored in a storage.

4. The device according to claim 1, wherein the heating part includes a coil wound around a stator of the electric motor.

5. The device according to claim 1, wherein the actuation delay measuring part measures, as the actuation delay, an elapsed time from a time point when the brake controller sends a command for actuating the braking mechanism to a time point when the braking mechanism holds the rotary shaft.

6. The device according to claim 1, wherein a load is previously applied to the rotary shaft in a gravity direction, wherein
   the actuation delay measuring part measures, as the actuation delay, a displacement of the rotary shaft in the gravity direction.

7. The device according to claim 1, further comprising an alarm generating part which generates an alarm signal, when the comparison part compares the actuation delay measured by the actuation delay measuring part with the reference value and detects that the actuation delay exceeds the reference value.

8. The device according to claim 1, further comprising:
   an image generating part which generates image data representing the actuation delay measured by the measuring part; and
   a display which displays the image data generated by the image generating part.

9. The device according to claim 1, further comprising an excitation controller which applies voltage to a coil wound around a stator of the electric motor so as to excite the electric motor when the actuation delay measured by the measuring part exceeds a predetermined acceptable value.

10. The device according to claim 1, further comprising a temperature detecting part which detects the temperature of the braking mechanism, wherein
    the heat controller controls the heating part so as to carry out the heating operation until the temperature detected by the temperature detecting part increases to a predetermined first temperature, wherein
    the brake controller actuates the braking mechanism, when the heat controller stops the heating operation and the temperature detected by the temperature detecting part decreases from the first temperature to a predetermined second temperature.

11. The device according to claim 1, wherein the heat controller heats the braking mechanism for a predetermined period, wherein
    the brake controller actuates the braking mechanism when a predetermined time elapses from when the heat controller stops the heating operation.

12. A method of inspecting a braking mechanism which holds a rotary shaft of an electric motor, comprising:
    heating the braking mechanism;
    stopping to heat the braking mechanism so as to decrease a temperature of the braking mechanism;
    actuating the braking mechanism when the temperature of the braking mechanism decreases;
    measuring an actuation delay of the braking mechanism when actuating the braking mechanism; and
    comparing the measured actuation delay with a reference value of the actuation delay of the braking mechanism.

* * * * *